United States Patent
Kim et al.

(10) Patent No.: US 10,826,265 B2
(45) Date of Patent: Nov. 3, 2020

(54) OPTICAL FREQUENCY STABILIZER USING OPTICAL FIBER DELAY LINE, AND METHOD FOR GENERATING STABLE OPTICAL FREQUENCY SIGNAL

(71) Applicant: KOREA ADVANCED INSTITUTE OF SCIENCE AND TECHNOLOGY, Daejeon (KR)

(72) Inventors: Jungwon Kim, Daejeon (KR); Dohyeon Kwon, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/572,636

(22) Filed: Sep. 17, 2019

(65) Prior Publication Data
US 2020/0091673 A1 Mar. 19, 2020

(30) Foreign Application Priority Data

Sep. 18, 2018 (KR) .................. 10-2018-0111348
Aug. 13, 2019 (KR) .................. 10-2019-0099012

(51) Int. Cl.
*H01S 3/137* (2006.01)
*H04J 14/02* (2006.01)
(Continued)

(52) U.S. Cl.
CPC .............. *H01S 3/137* (2013.01); *H01S 3/067* (2013.01); *H01S 3/10007* (2013.01);
(Continued)

(58) Field of Classification Search
CPC ...... H01S 3/137; H01S 3/067; H01S 3/10007; H01S 3/1398; H01S 2301/02; H04J 14/0202
See application file for complete search history.

(56) References Cited

U.S. PATENT DOCUMENTS

| 6,850,543 B2 | 2/2005 | Cundiff et al. |
| 2005/0185683 A1* | 8/2005 | Ohtsuki .............. G03F 7/70575 372/26 |

(Continued)

FOREIGN PATENT DOCUMENTS

| JP | 2017-538113 | 12/2017 |
| KR | 10-1687118 | 12/2016 |

(Continued)

OTHER PUBLICATIONS

Jones, David J., et al. "Carrier-envelope phase control of femtosecond mode-locked lasers and direct optical frequency synthesis." Science 288.5466, pp. 635-639, Apr. 2000.
(Continued)

*Primary Examiner* — Thai Q Tran
*Assistant Examiner* — Sunghyoun Park
(74) *Attorney, Agent, or Firm* — Lex IP Meister, PLLC

(57) ABSTRACT

A frequency stabilizer includes: a delay line interferometer that receives an optical signal corresponding to one frequency mode of a pulsed laser, divides and transmits the received optical signal to a reference arm and a delay arm including an optical fiber delay line, and then outputs an interference signal between signals passing through the reference arm and the delay arm; a photoelectric converter that converts the interference signal into an electrical signal; a mixer that generates a baseband signal of the electrical signal by mixing a carrier frequency signal; and a feedback controller that transmits a control signal generated based on the baseband signal to the pulsed laser. The optical signal passing through the delay arm is weighted with a delay time caused by the optical fiber delay line compared to the optical signal passing through the reference arm, and the optical signal passing through the delay arm is frequency shifted to a carrier frequency of an oscillator. A carrier-envelope offset
(Continued)

frequency of the pulsed laser is stabilized by an offset frequency stabilizer.

4 Claims, 13 Drawing Sheets

(51) Int. Cl.
  *H01S 3/067* (2006.01)
  *H01S 3/10* (2006.01)
  *H01S 3/139* (2006.01)
(52) U.S. Cl.
  CPC ........ *H01S 3/1398* (2013.01); *H04J 14/0202* (2013.01); *H01S 2301/02* (2013.01)

(56) References Cited

U.S. PATENT DOCUMENTS

2006/0187537 A1* 8/2006 Huber ................ G01B 9/02091
                                                          359/337.22
2009/0174931 A1* 7/2009 Huber ................... H01S 3/1109
                                                          359/340

FOREIGN PATENT DOCUMENTS

| KR | 10-1788073 | 10/2017 |
| KR | 10-2018-0055077 | 5/2018 |
| KR | 10-1856882 | 5/2018 |

OTHER PUBLICATIONS

Kwangyun Jung et al. "All-fibre photonic signal generator for attosecond timing and ultralow-noise microwave", Scientific reports 5, Nov. 2015.

Fortier, T. M., et al. "Generation of ultrastable microwaves via optical frequency division." Nature Photonics 5.7, pp. 425-429, Jul. 2011.

Sie-Wook Jeon et al. "All-optical clock extraction from 10-Gbit/s NRZ-DPSK data using modal interference", Photonics Conference 2009 pp. 392-393, Dec. 2009.

Sung-Kuk Yang et al., "A Study on Optical Coherence Tomography System by Using the Optical Fiber", Journal of the Korean Institute of Illuminating and Electrical Installation Engineers vol. 18 No. 4 pp. 34-40, Jul. 2004.

* cited by examiner (a)

(b)

(a)

(b)

(a)

(b)

OPTICAL FREQUENCY STABILIZER USING OPTICAL FIBER DELAY LINE, AND METHOD FOR GENERATING STABLE OPTICAL FREQUENCY SIGNAL

CROSS-REFERENCE TO RELATED APPLICATION

This application claims priority to and the benefit of Korean Patent Application No. 10-2018-011348 and 10-2019-0099102 filed in the Korean Intellectual Property Office on Sep. 18, 2018 and Aug. 13, 2019, the entire contents of which are incorporated herein by reference.

BACKGROUND

(a) Field

The present disclosure relates to low-noise optical signal/microwave signal generation technology.

(b) Description of the Related Art

Low-noise optical signal/microwave signal generation technology is the basic technology of various measurement systems, including defense systems. Therefore, noise performance superior to the prior art have been continuously researched. At the same time, there is a high demand for optical frequency stabilizers or microwave synthesizers that are cost-competitive and mechanically robust for commercialization.

High-performance stabilizers known so far use Optical Frequency Division (OFD) technology that interferes between the frequency mode of an optical frequency comb and a Continuous Wave laser (CW laser) stabilized to a high finesse cavity. However, OFD-based stabilizers need high-performance vacuum chamber, vibration isolation system and temperature stabilization system. OFD-based stabilizers are complex in structure, large in size, and expensive. In addition, the stabilizer known so far can stabilize only one laser, which greatly increases the cost burden when multiple lasers are supposed to be stabilized.

The above information disclosed in this Background section is only for enhancement of understanding of the background of the invention and therefore it may contain information that does not form the prior art that is already known in this country to a person of ordinary skill in the art.

SUMMARY

Some embodiments of the present disclosure provide an apparatus and method for stabilizing the optical frequency of a pulsed laser using an optical fiber delay line interferometer, and in particular, an apparatus and method for stabilizing an optical frequency comb only with single frequency mode.

Some embodiments of the present disclosure provide an apparatus and method for reducing the effect of the carrier-envelope offset frequency of the pulsed laser on the optical frequency stabilization by transmitting a frequency mode from which a carrier-envelope offset frequency is removed to an optical fiber delay line interferometer or by using a pulsed laser whose carrier-envelope offset frequency is stabilized.

Some embodiments of the present disclosure provide an apparatus and a method for stabilizing a plurality of lasers at the same time, with a single optical fiber delay line, regardless of the repetition rate.

A frequency stabilizer according to an exemplary embodiment of the present disclosure includes: a delay line interferometer receiving an optical signal corresponding to one frequency mode of a pulsed laser, dividing and transmitting the received optical signal to a reference arm and a delay arm including an optical fiber delay line, and then outputting an interference signal between signals passing through the reference arm and the delay arm; a photoelectric converter converting the interference signal into an electrical signal; a mixer for generating a baseband signal of the electrical signal by mixing a carrier frequency signal, and a feedback controller transmitting a control signal generated based on the baseband signal to the pulsed laser. The optical signal passing through the delay arm is weighted with a delay time caused by the optical fiber delay line compared to the optical signal passing through the reference arm, and the optical signal passing through the delay arm is frequency shifted to a carrier frequency of an oscillator. A carrier-envelope offset frequency of the pulsed laser is stabilized by an offset frequency stabilizer.

The delay line interferometer may include a coupler dividing and transmitting the received optical signal to the reference arm and the delay arm, and then outputting the interference signal between signals passing through the reference arm and the delay arm to the photoelectric converter; the optical fiber delay line located in the delay arm; and a frequency modulator for shifting the frequency of the optical signal passing through the delay arm to the carrier frequency of the oscillator.

The offset frequency stabilizer may detect the value of the carrier-envelope offset frequency using two frequency modes extracted from the pulsed laser, and fix the carrier-envelope offset frequency of the pulsed laser to the detected value, or to zero.

The frequency stabilizer may further include a multiplier that multiplies the carrier frequency of the oscillator. The mixer may mix the carrier frequency signal multiplied by the multiplier and the electrical signal, and generate the baseband signal of the electrical signal.

A frequency stabilizer according to another exemplary embodiment includes: a delay line interferometer receiving an optical signal corresponding to a specific frequency mode of a pulsed laser, dividing and transmitting the received optical signal to a reference arm and a delay arm including an optical fiber delay line, and then outputting an interference signal between signals passing through the reference arm and the delay arm; a photoelectric converter converting the interference signal into an electrical signal; a mixer for generating a baseband signal of the electrical signal by mixing a carrier frequency signal; and a feedback controller transmitting a control signal generated based on the baseband signal to the pulsed laser. The optical signal passing through the delay arm is weighted with a delay time caused by the optical fiber delay line compared to the optical signal passing through the reference arm, and the optical signal passing through the delay arm is frequency shifted to a carrier frequency of an oscillator. The optical signal corresponding to the specific frequency mode is a signal from which a carrier-envelope offset frequency of the pulsed laser is removed.

The frequency stabilizer may further include a difference frequency generator receiving signals of two frequency modes extracted from the pulsed laser, generating a difference signal having the difference frequency of the two frequency modes, and transmitting the difference signal to the delay line interferometer. The difference signal may be the optical signal corresponding to the specific frequency mode.

The frequency stabilizer may further include an offset frequency modulator shifting a first signal of the specific frequency mode extracted from the pulsed laser by the carrier-envelope offset frequency to generate a second signal from which the carrier-envelope offset frequency is removed, and transmitting the second signal to the delay line interferometer. The second signal may be the optical signal corresponding to the specific frequency mode.

The delay line interferometer may include a coupler dividing and transmitting the received optical signal to the reference arm and the delay arm, and then outputting the interference signal between signals passing through the reference arm and the delay arm to the photoelectric converter; the optical fiber delay line located in the delay arm; and a frequency modulator for shifting the frequency of the optical signal passing through the delay arm to the carrier frequency of the oscillator.

The frequency stabilizer may further include a multiplier that multiplies the carrier frequency of the oscillator. The mixer may mix the carrier frequency signal multiplied by the multiplier and the electrical signal, and generate the baseband signal of the electrical signal.

A frequency stabilizer according to another exemplary embodiment includes a first wavelength division multiplexer for multiplexing signals of different frequencies extracted from a plurality of pulsed lasers; a delay line interferometer receiving an optical signal multiplexed by the first wavelength division multiplexer, dividing and transmitting the received optical signal to a reference arm and a delay arm including an optical fiber delay line, and then outputting an interference signal between signals passing through the reference arm and the delay arm; a second wavelength division multiplexer for dividing the interference signal into a frequency signal corresponding to each pulsed laser; a plurality of photoelectric converters for converting each frequency signal divided by the second wavelength division multiplexer into a corresponding electrical signal; a plurality of mixers for generating a baseband signal of a corresponding electrical signal output from each photoelectric converter by mixing a carrier frequency signal; and a plurality of feedback controllers for transmitting a control signal generated based on each baseband signal to the corresponding pulsed laser. The multiplexed optical signal passing through the delay arm is weighted with a delay time caused by the optical fiber delay line compared to the optical signal passing through the reference arm, and the multiplexed optical signal passing through the delay arm is frequency shifted to a carrier frequency of an oscillator.

The delay line interferometer may compensate for the speed difference between different frequency signals included in the multiplexed optical signal in the delay arm and output the interference signal.

The delay line interferometer may compensate for the speed difference through a delay control unit adjusting the path of each of the different frequency signals included in the multiplexed optical signal.

The delay line interferometer may compensate for the speed difference between different frequency signals included in the multiplexed optical signal through a dispersion compensating fiber included in the delay arm.

The delay line interferometer may compensate for the speed difference between different frequency signals included in the multiplexed optical signal through a polarization maintaining fiber included in the delay arm.

each of the plurality of pulsed lasers may have a stabilized carrier-envelope offset frequency by an offset frequency stabilizer.

Each of the signals of different frequencies extracted by the plurality of pulsed lasers may be a signal from which a carrier-envelope offset frequency of the corresponding pulsed laser is removed.

According to some embodiments, it is possible to provide a frequency stabilizer which is extremely small, low cost and excellent in noise performance. In addition, by generating the optical signal/microwave signal through the stabilized pulsed laser, it is possible to provide a low noise optical signal/microwave signal source.

According to some embodiments, a plurality of lasers can be stabilized at the same time with a single optical fiber delay line.

According to some embodiments, the frequency stabilizer has excellent noise performance, competitive price, and mechanical stability compared to the conventional optical frequency stabilizers or microwave frequency synthesizers.

BRIEF DESCRIPTION OF THE DRAWINGS

Each of FIG. 5

Figure 7:
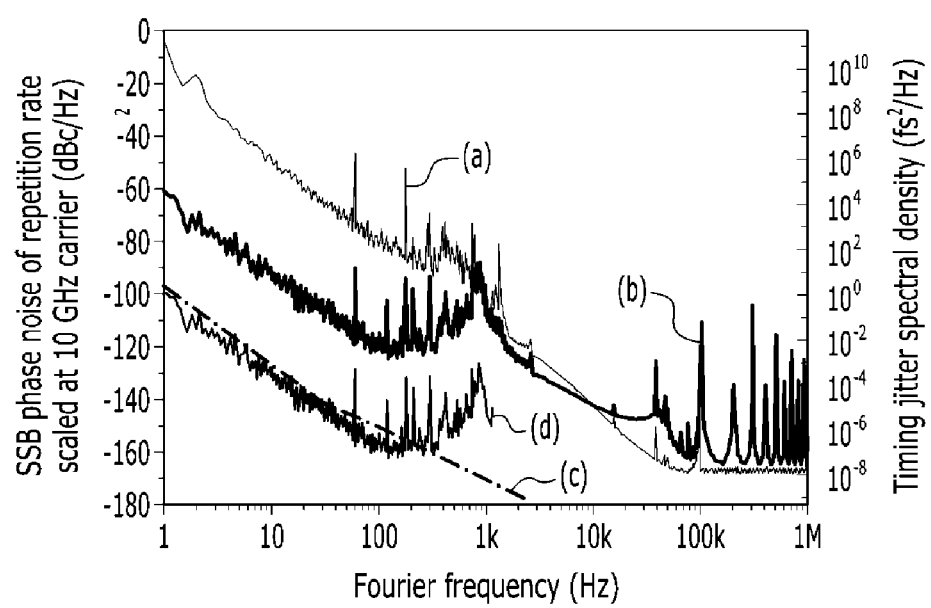
Figure 8:
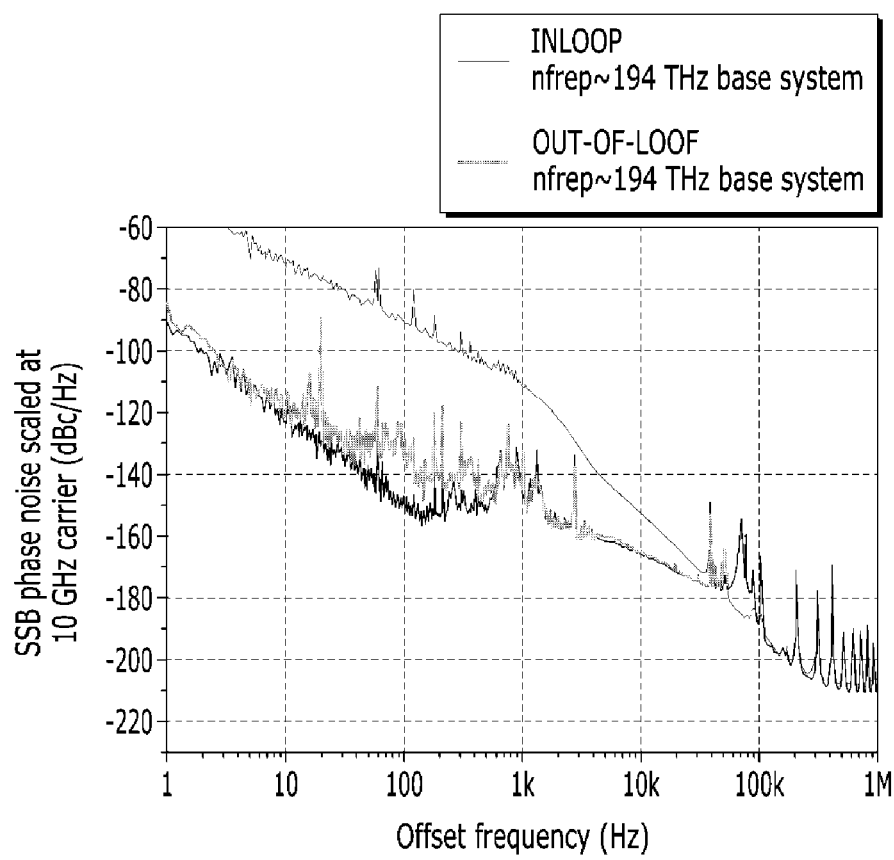
Figure 9:
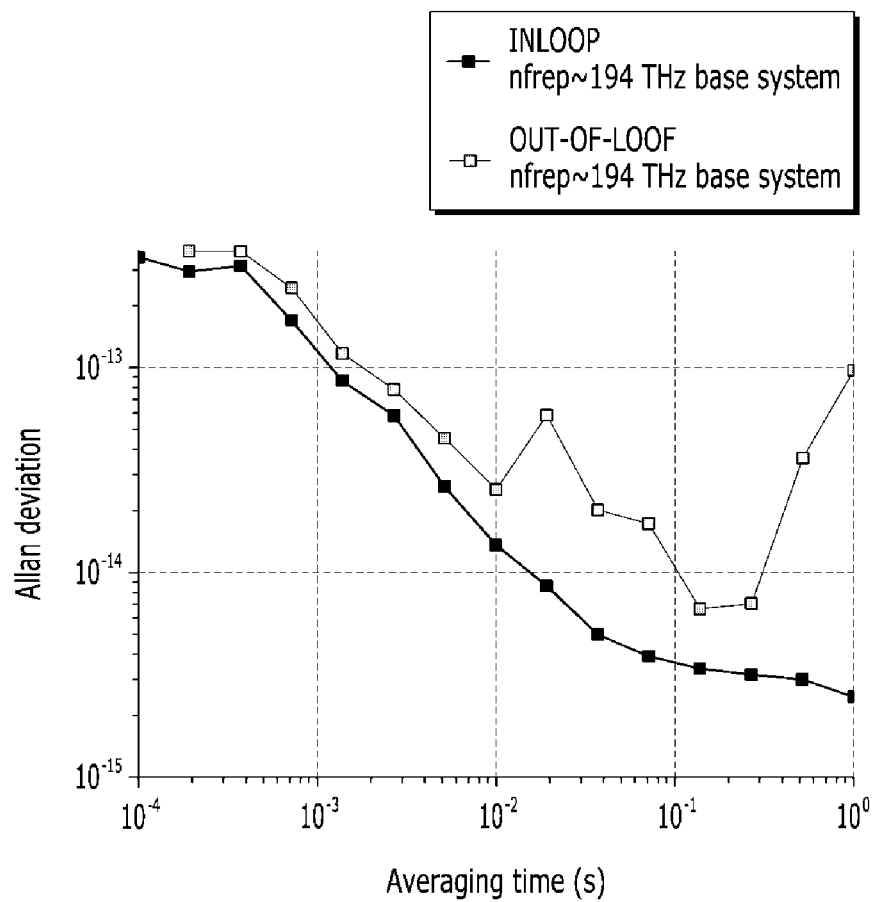

Each of FIG. 7 to FIG. 9 is a graph showing a frequency stabilizing effect of a pulsed laser according to an exemplary embodiment, respectively.

Figure 10:
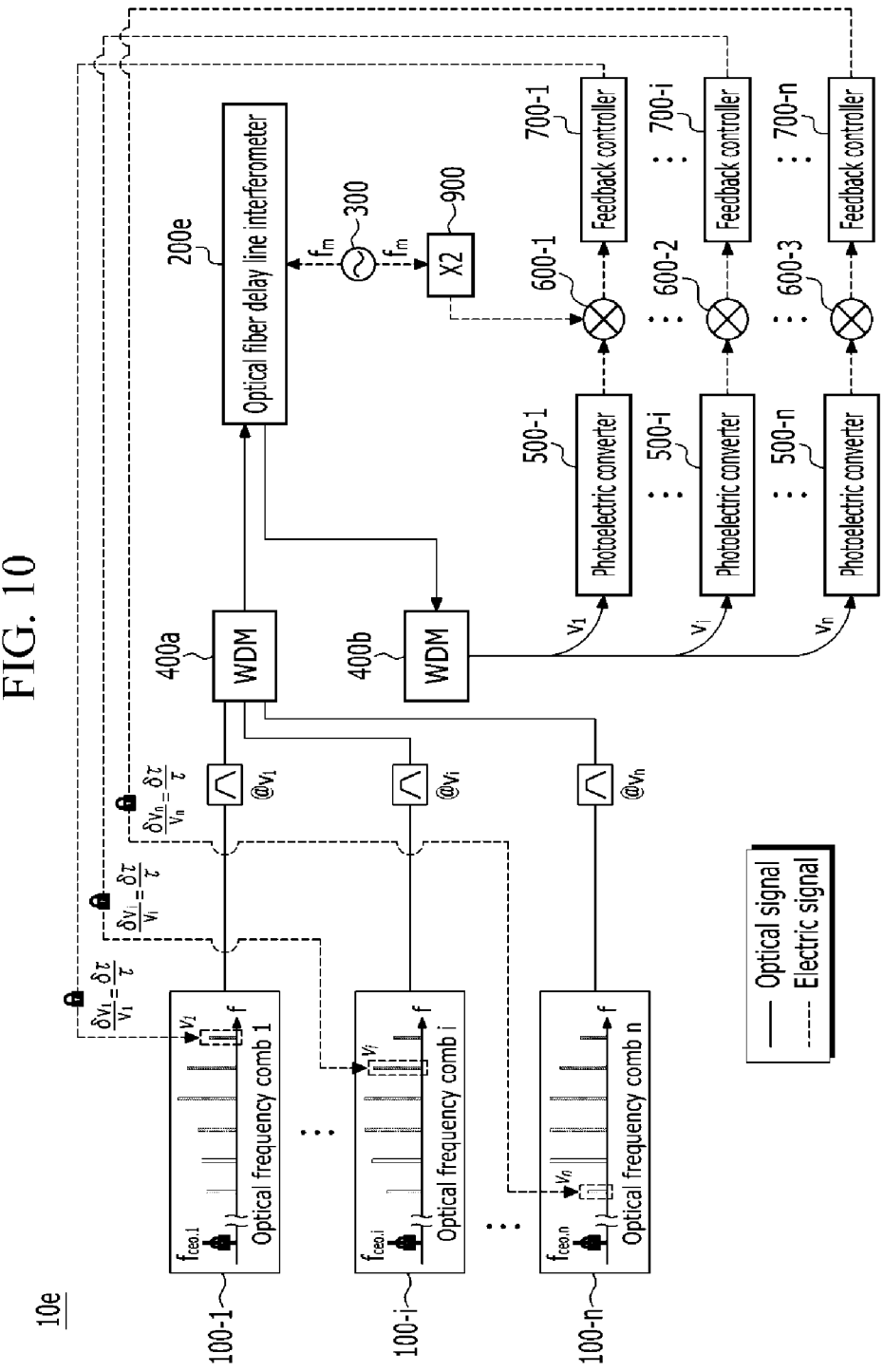

FIG. 10 is a block diagram of a frequency stabilizer for a plurality of pulsed lasers according to an exemplary embodiment.

Figure 11:
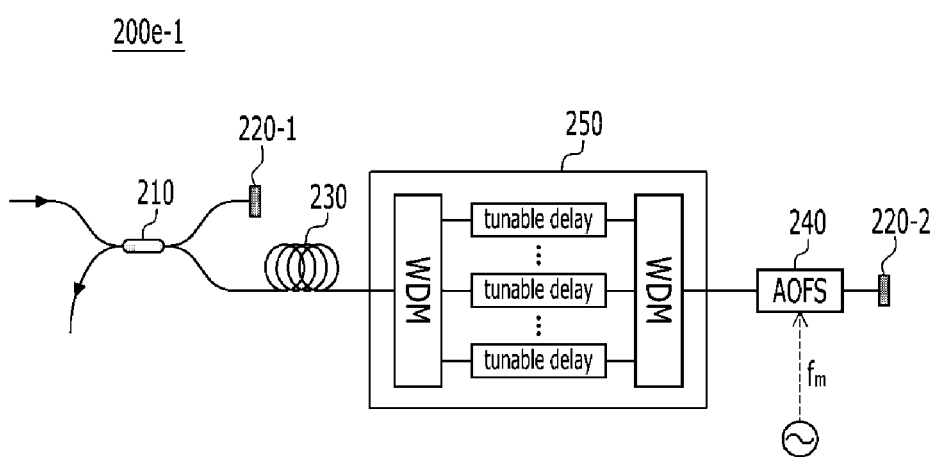
Figure 12:
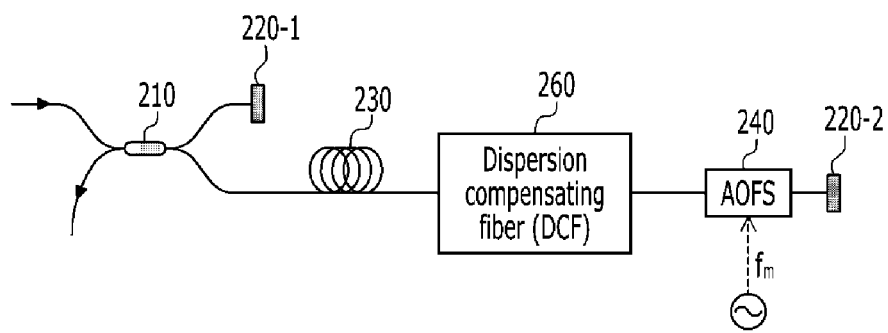
Figure 12:
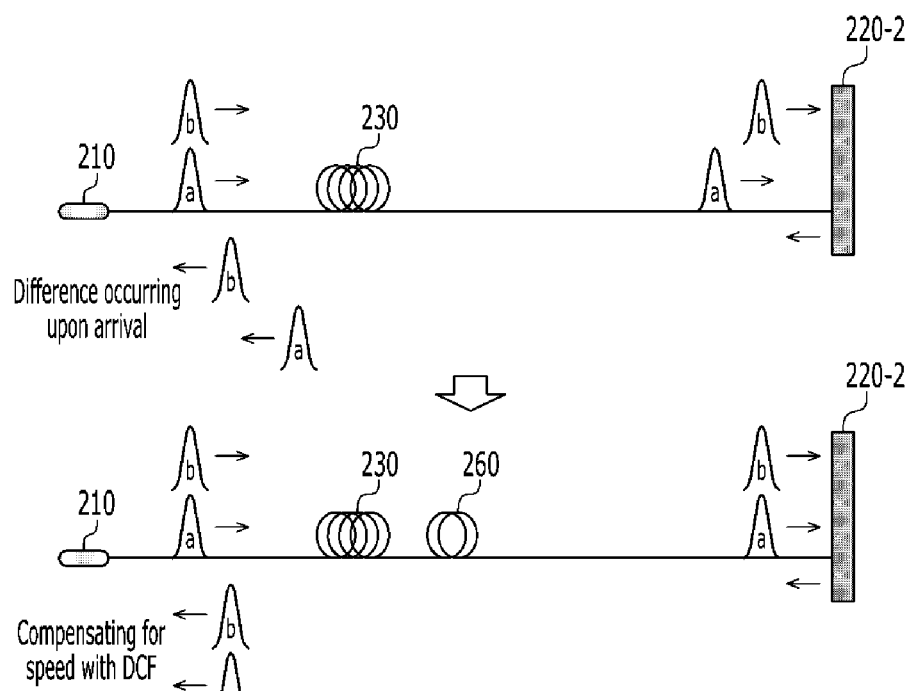
Figure 13:
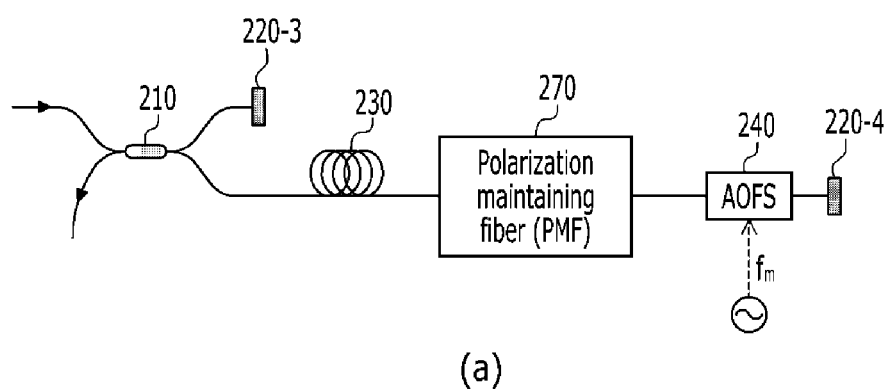
Figure 13:
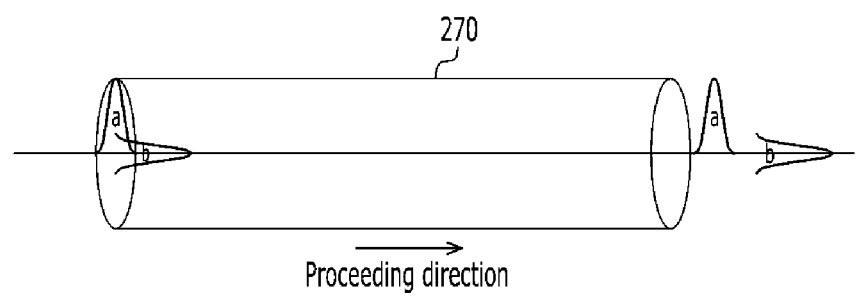

Each of FIG. 11 to FIG. 13 is a block diagram illustrating an optical fiber delay line interferometer used in a frequency stabilizer of a multi-pulsed laser according to an exemplary embodiment, respectively.

DETAILED DESCRIPTION OF THE EMBODIMENTS

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

A pulsed laser is represented as a discontinuous spectrum of constant frequency intervals ($f_{rep}$) in the frequency domain, which may be referred to as an optical frequency comb. Therefore, the frequency stabilizers according to the exemplary embodiments can be described that they stabilize the frequency of the pulsed laser, or stabilize the optical frequency comb. The $n^{th}$ comb-line of an optical frequency comb in the frequency domain is called the $n^{th}$ frequency mode $v_n$.

In the description, the optical fiber delay line interferometer may use the principle of the Michelson interferometer as an example. However, other interferometers such as the Mach-Zehnder interferometer may be used instead of the Michelson interferometer.

In the description, a frequency mode may mean very narrow frequency band filtered from the pulsed laser. That is, each frequency mode has a narrow frequency bandwidth (e.g., 1 nm) which is very narrow compared to the center wavelength (e.g., 1540 nm, 1560 nm) and is simply represented as $nf_{rep}+f_{ceo}$.

Figure 1:
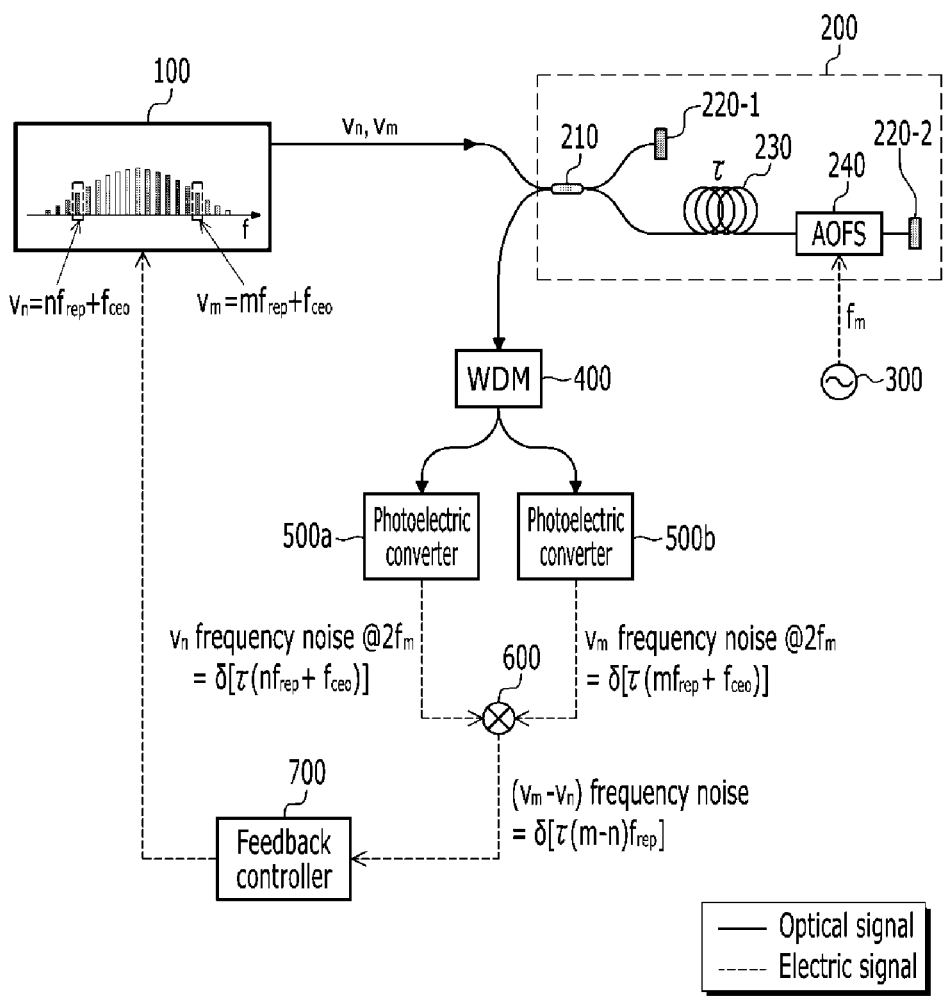
FIG. 1 is a block diagram of a frequency stabilizer using two frequency modes according to an exemplary embodiment.

FIG. 1 is a block diagram of a frequency stabilizer using two frequency modes according to an exemplary embodiment.

Referring to FIG. 1, a frequency stabilizer 10a stabilizes the frequency of a pulsed laser 100. To cancel the carrier-envelope offset frequency (simply referred to as "offset frequency") $f_{ceo}$ of the pulsed laser 100, two frequency modes $v_n$ and $v_m$ of the pulsed laser 100 are used. $v_n$ is a $n^{th}$ frequency mode, $v_m$ is a $m^{th}$ frequency mode, and $v_n$ and $v_m$ are expressed as integer multiples of the repetition rate $f_{rep}$ of the pulsed laser 100. For example, $v_n=nf_{rep}+f_{ceo}$, $v_m=mf_{rep}+f_{ceo}$. When a pulse train having a time interval $T_{rep}$ between pulses of several ns to several tens of ns is outputted, the repetition rate $f_{rep}$, which is the inverse of a period, is from hundreds of MHz to several GHz.

Specifically, the frequency stabilizer 10a may include the pulsed laser 100, an optical fiber delay line interferometer 200, an oscillator 300, a wavelength division multiplexer (WDM)/wavelength splitter 400, two photoelectric converters 500a, 500b, a mixer 600, and a feedback controller 700. Each photoelectric converter may include a photodiode, a radio-frequency bandpass filter, and an amplifier.

In the pulsed laser 100, optical signals (optical pulses) of two frequency modes $v_n$ and $v_m$ are extracted, and the optical signals of two frequency modes are transmitted to the optical fiber delay line interferometer 200. The optical signals of two frequency modes may be extracted with an Optical bandpass filter of a corresponding frequency.

The optical fiber delay line interferometer 200 includes a reference arm and a delay arm by an optical fiber delay line τ, and interferes with two signals passing through the reference arm and the delay arm.

To this end, the optical fiber delay line interferometer 200 may include a coupler 210, Faraday rotating mirrors (FRM) 220-1 and 220-2, an optical fiber delay line 230, and a frequency modulator 240. The frequency modulator 240 may be an acousto-optic frequency shifter (AOFS). In order for interference to occur in the coupler 210, the reference arm and the delay arm must maintain the same polarization state. To this end, the Faraday rotor mirrors 220-1 and 220-2 may be disposed at the ends of the reference arm and the delay arm.

The coupler 210 divides the optical signals of the two frequency modes $v_n$ and $v_m$ and transmits them to the reference arm and the delay arm. The coupler 210 may be a 50:50 coupler.

The optical signal transmitted to the reference arm is reflected by the Faraday rotating mirror (FRM) 220-1 and returned to the coupler 210.

The optical signal transmitted to the delay arm is also reflected by the Faraday rotating mirror (FRM) 220-2 and returned to the coupler 210. The optical signal transmitted to the delay arm is delayed by the optical fiber delay line τ and frequency modulated by the frequency modulator (AOFS) 240, compared to the optical signal transmitted through the reference arm. In this case, the frequency modulator (AOFS) 240 shifts the frequency of the optical signal passing through the delay arm by using the frequency $f_m$ of the oscillator 300 which is a carrier. Since the optical signal do a round trip on the delay arm, the frequency of the optical signal passing through the delay arm is shifted by $2f_m$.

In the coupler 210, the optical signal passing through the reference arm and the optical signal passing through the delay arm interfere with each other. The interference signal output from the coupler 210 is transmitted to the wavelength division multiplexer 400.

The wavelength division multiplexer 400 divides or splits the interference signal into wavelength components corresponding to two frequency modes $v_n$ and $v_m$.

The optical signal of the frequency mode $v_n$ divided from the interference signal is converted into a first microwave signal, which is an electrical signal, in the photoelectric converter 500a. The optical signal of the frequency mode $v_m$ divided from the interference signal is converted into a second microwave signal in the photoelectric converter 500b. In this case, the noises of the first microwave signal and the second microwave signal are weighted with a delay time τ caused by the optical fiber delay line. The first microwave signal has noise $\delta[\tau(v_n)]$ at carrier frequency $2f_m$ and the second microwave signal has noise $\delta[\tau(v_m)]$ at carrier frequency $2f_m$. That is, the noise of the frequency mode $v_n$ is represented by $\delta[\tau(nf_{rep}+f_{ceo})]$, and the noise of the frequency mode $v_m$ is represented by $\delta[\tau(nf_{rep}+f_{ceo})]$.

The first microwave signal and the second microwave signal output from the photoelectric converters 500a and 500b are mixed in the mixer 600, and the mixer 600 generates a baseband signal obtained by canceling common components of the two signals. Here, the offset frequency noise $\delta[\tau(f_{ceo})]$ common between the first microwave signal and the second microwave signal is canceled out. The frequency noise $\delta[\tau((m-n)f_{rep})]$ included in the baseband signal is fed back to the pulsed laser 110 via the feedback controller 700.

As such, since the frequency stabilizer 10a stabilizes the pulsed laser 100 using two frequency modes, the sensitivity is limited to the difference between the two frequency modes and can be changed depending on the system implementation. As a specific case, when two wavelengths 1540 nm and 1560 nm are used, the sensitivity is limited to the difference $[v_m-v_n=(m-n)f_{rep}=2.5$ THz$]$ between the two wavelengths 1540 nm and 1560 nm.

In addition, since the frequency stabilizer 10a uses two frequency modes, there is a disadvantage that a separate device for compensating for dispersion of different frequencies is required.

Next, a frequency stabilizer using a single frequency mode will be described.

Figure 2:
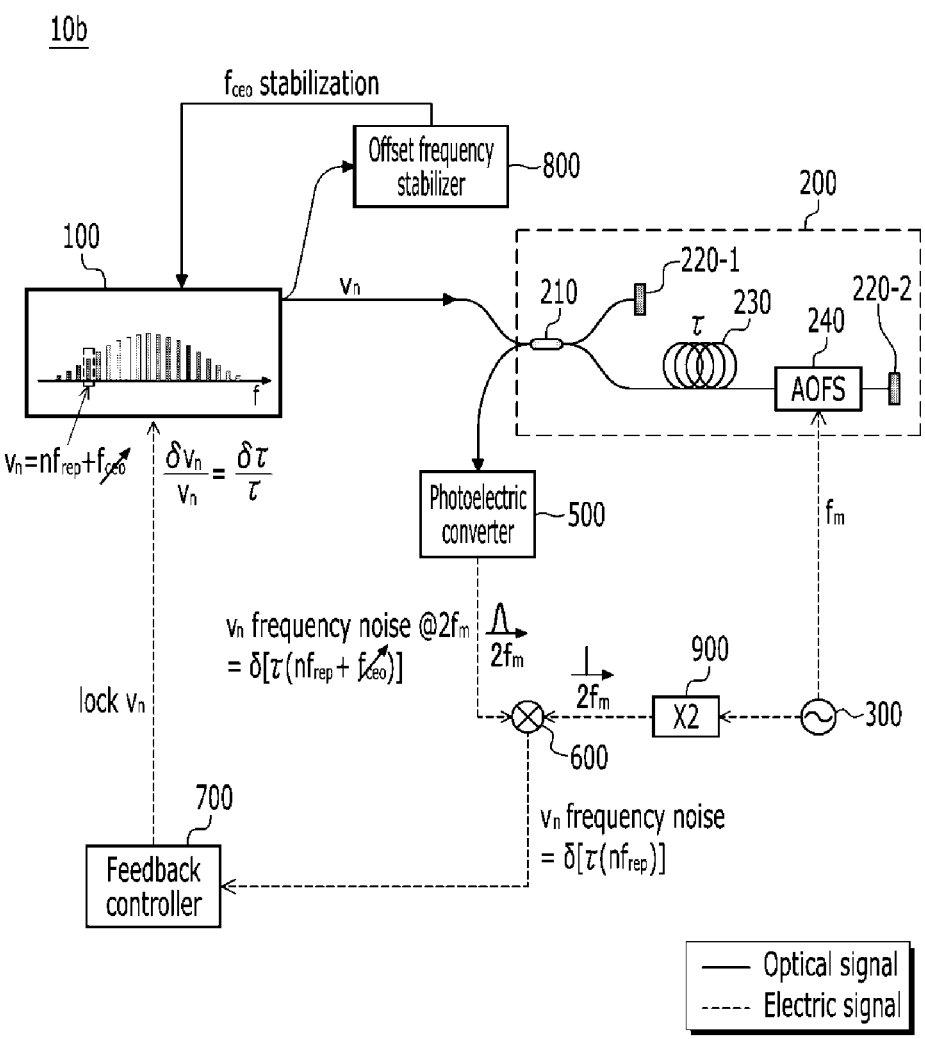
FIG. 2 is a block diagram of a frequency stabilizer using a single frequency mode according to an exemplary embodiment.
Figure 3:
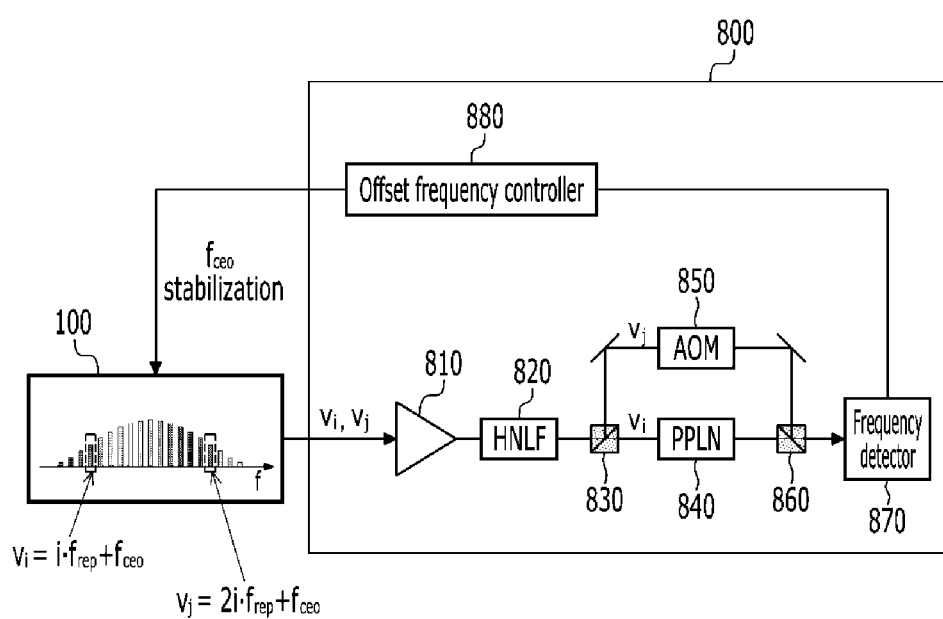
FIG. 3 is a block diagram of an offset frequency stabilizer according to an exemplary embodiment.

FIG. 2 is a block diagram of a frequency stabilizer using one frequency mode according to an exemplary embodiment, FIG. 3 is a block diagram of an offset frequency stabilizer according to an exemplary embodiment, and FIG.

4 is a diagram illustrating a frequency stabilization method of a pulsed laser according to an exemplary embodiment in a frequency domain.

Referring to FIG. 2, a frequency stabilizer 10b stabilizes the frequency of a pulsed laser 100 by using an offset frequency locking and an optical fiber delay line. Specifically, the frequency stabilizer 10b stabilizes the offset frequency of the pulsed laser 100 through a separate interferometer, and then stabilizes the frequency of the pulsed laser 100 using only one frequency mode of the pulsed laser 100 with the offset frequency stabilized (locked).

The frequency stabilizer 10b, like the frequency stabilizer 10a, includes the pulsed laser 100, an optical fiber delay line interferometer 200, an oscillator 300, one photoelectric converter 500, a mixer 600, and a feedback controller 700. The frequency stabilizer 10b further includes an offset frequency stabilizer 800 and a frequency multiplier 900.

The offset frequency stabilizer 800 may fix the offset frequency $f_{ceo}$ of the pulsed laser 100 using two frequency modes of the pulsed laser 100. The offset frequency $f_{ceo}$ of the pulsed laser 100 may be fixed to zero or a nonzero value by the offset frequency stabilizer 800.

In the pulsed laser 100 where the offset frequency $f_{ceo}$ is stabilized by the offset frequency stabilizer 800, an optical signal of one frequency mode $v_n$ ($v_n = nf_{rep} + f_{ceo}$) is extracted/filtered. The extracted optical signal is transmitted to the optical fiber delay line interferometer 200. The optical signal of the frequency mode $v_n$ can be extracted by an optical bandpass filter.

Similar to FIG. 1, the optical fiber delay line interferometer 200 includes a reference arm and a delay arm by an optical fiber delay line $\tau$ and interferes between two signals passing through different arms. The optical fiber delay line may be implemented with, for example, a 1 km-long optical fiber wound around 7 cm (inner)-8 cm (outer) diameter.

The coupler 210 divides the optical signal of the frequency mode $v_n$ extracted from the pulsed laser 100 and transmits the divided optical signals to the reference arm and the delay arm, respectively. The optical signal transmitted to the reference arm is reflected by a Faraday rotating mirror (FRM) 220-1 and returned to the coupler 210, and the optical signal transmitted to the delay arm is also reflected by a Faraday rotating mirror (FRM) 220-2 and returned to the coupler 210. In this case, the optical signal transmitted to the delay arm is delayed by the optical fiber delay line $\tau$ and frequency modulated by a frequency modulator (AOFS) 240, compared to the optical signal transmitted to the reference arm. In this case, the frequency modulator (AOFS) 240 shifts the frequency of the optical signal passing through the delay arm by the frequency $f_m$ of the oscillator 300. Since the optical signal does a round trip on the delay arm, the frequency of the optical signal passing through the delay arm is shifted by $2f_m$.

In the coupler 210, the optical signal passing through the reference arm and the optical signal passing through the delay arm interfere with each other. The interference signal output from the coupler 210 is transmitted to the photoelectric converter 500.

The photoelectric converter 500 may be implemented as a photodiode and may include a frequency bandpass filter and an amplifier. The photoelectric converter 500 converts the interference signal into a microwave signal (electric signal) corresponding to the frequency mode $v_n$. The microwave signal output from the photoelectric converter 500 has noise $\delta[\tau(nf_{rep} + f_{ceo})]$ at a carrier frequency $2f_m$. In this case, the offset frequency $f_{ceo}$ has been fixed by the offset frequency stabilizer 800.

Meanwhile, the mixer 600 mixes the microwave signal output from the photoelectric converter 500 and the frequency $2f_m$ of the frequency multiplier 900 to output a baseband microwave signal. The frequency multiplier 900 may generate a signal having frequency $2f_m$ by doubling the frequency $f_m$ of the oscillator 300.

Thus, in the mixer 600, the baseband microwave signal is output, and a control signal generated based on the frequency noise $\delta[\tau(nf_{rep} + f_{ceo})]$ included in the baseband signal is fed back to the pulsed laser 100 through the feedback controller 700. Here, since the offset frequency $f_{ceo}$ is stabilized, $\delta f_{ceo}$ has a very small value compared to $\delta nf_{rep}$. Therefore, the measured noise can be regarded as the noise $\delta nf_{rep}$ of the repetition rate frequency, and the optical frequency comb can be stabilized by feeding back the noise of the repetition rate frequency.

As such, since the frequency stabilizer 10b uses the pulsed laser 100 whose offset frequency is stabilized already, unlike in FIG. 1, the sensitivity is not limited to the difference between the two frequency modes. That is, the frequency stabilizer 10b may provide sensitivity of 194 THz level when the frequency mode of 194 THz is used for frequency stabilization. In addition, since the frequency stabilizer 10b uses only one frequency mode, there is an advantage that a separate device for compensating dispersion of different frequencies is not required.

Referring to FIG. 3, the offset frequency stabilizer 800 may fix the offset frequency $f_{ceo}$ of the pulsed laser 100 using two frequency modes of the pulsed laser 100. The offset frequency $f_{ceo}$ of the pulsed laser 100 may be fixed to zero or a nonzero value depending on the setting.

The offset frequency stabilizer 800 may be implemented in various ways, for example, may be implemented using an f-to-2f interferometry. The offset frequency stabilizer 800 may use a waveguide using a highly nonlinear fiber (HNLF) or a material having high nonlinearity to obtain a wide frequency spectrum of more than an octave.

The offset frequency stabilizer 800 may include a fiber amplifier (FA) 810, a high nonlinear fiber (HNLF) 820, a beam splitter 830, a periodic poled lithium niobite (PPLN) 840 corresponding to a nonlinear crystal, an acousto-optic modulator (AOM) 850, a beam combiner 860, a frequency detector 870, and an offset frequency controller 880.

The optical signals of the two frequency modes of the pulsed laser 100 are input to the offset frequency stabilizer 800. Among the two frequency modes, the low-frequency mode $v_i$ may be represented by $[i*f_{rep} + f_{ceo}]$ and the high-frequency mode $v_j$ (j=2i) may be represented by $[2i*f_{rep} + f_{ceo}]$.

The optical signals of the two frequency modes $v_i$ and $v_j$ of the pulsed laser 100 are amplified by the optical fiber amplifier 810, passed through the high nonlinear optical fiber (HNLF) 820, and then transmitted to the beam splitter 830. The optical fiber amplifier 810 may be, for example, an erbium-doped fiber amplifier (EDFA).

The beam splitter 830 guides the optical signal of the low-frequency mode $v_i$ to a first path including the nonlinear crystal 840 and guides the optical signal of the high-frequency mode $v_j$ to a second path including the acousto-optic modulator 850. In the first path including the nonlinear crystal 840, the optical signal of the low-frequency mode $v_i$ is converted into a nonlinear signal having a frequency $2v_i$. The acousto-optic modulator 850 may shift the frequency of the signal passing through the second path in accordance with the magnitude of the offset frequency desired by the pulsed laser 100.

The beam combiner 860 interferes with the signal of frequency $2v_i$ output from the first path and the signal of frequency $v_{j=2i}$ output from the second path. The beam combiner 860 outputs an interference signal among two input optical signals. The interference signal corresponds to a frequency difference $2v_i-v_j$ between two optical signals passing through different paths, and the frequency of the interference signal may be the offset frequency $f_{ceo}$.

The frequency detector 870 measures the frequency of the interference signal output from the beam combiner 860. The measured frequency may be the offset frequency $f_{ceo}$ and are transmitted to the offset frequency controller 880. The offset frequency controller 880 provides a feedback signal for fixing the offset frequency to the pulsed laser 100. The offset frequency controller 880 may generate a reference signal close to the offset frequency of the pulsed laser 100 and feedback the phase error of the reference signal and the measured signal to the pulsed laser 100 to stabilize the offset frequency of the pulsed laser 100.

Meanwhile, the offset frequency stabilizer 800 may be implemented to adjust the magnitude of the offset frequency $f_{ceo}$ to zero by shifting the frequency of the signal traveling along the second path in the acousto-optic modulator 850 by the offset frequency $f_{ceo}$.

Figure 4:
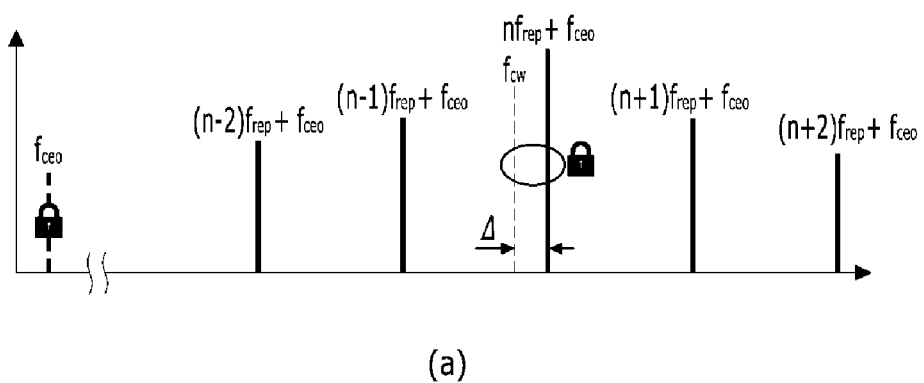
FIG. 4 is a diagram illustrating a frequency stabilization method of a pulsed laser according to an exemplary embodiment in a frequency domain.
Figure 4:
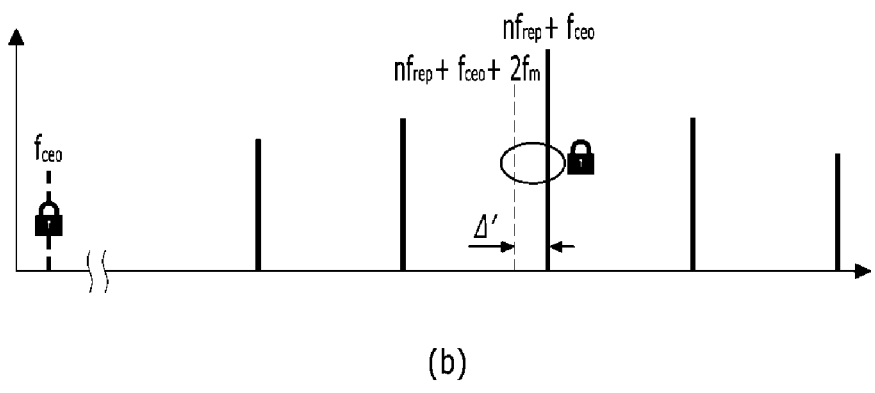

Referring to FIG. 4, (a) illustrates an optical frequency division (OFD) technology in which a conventional high-performance stabilizer interferes with a continuous wave laser ($f_{cw}$=194 THz) stabilized to a high finesse cavity and an $n^{th}$ frequency mode ($nf_{rep}+f_{ceo}$) and stabilizes a frequency difference $\Delta=nf_{rep}+f_{ceo}-f_{cw}$ due to interference to a constant value.

(b) illustrates a technique in which the frequency stabilizer 10b stabilizes the optical frequency comb using the offset frequency stabilizer 800 and the optical fiber delay line interferometer 200 without using the continuous wave laser stabilized to the high finesse cavity.

The frequency stabilizer 10b stabilizes the offset frequency $f_{ceo}$ of the pulsed laser 100 through the separate offset frequency stabilizer 800. In addition, the frequency stabilizer 10b transmits the optical signal of the $n^{th}$ frequency mode ($v_n=nf_{rep}+f_{ceo}$) to the reference arm of the optical fiber delay line interferometer 200 and generates a signal ($nf_{rep}+f_{ceo}+2f_m$) obtained by shifting the $n^{th}$ frequency mode signal by $2f_m$ in the delay arm. Interfering two signals passing through the reference arm and the delay arm with each other yields a frequency difference $\Delta'=2f_m$ as shown in (b). In particular, since the offset frequency $f_{ceo}$ in the frequency stabilizer 10b has been stabilized, it is possible to detect a signal obtained by amplifying the noise $\delta nf_{rep}$ of the repetition rate frequency with a delay time. Therefore, the frequency stabilizer 10b can stabilize the optical frequency comb with very high sensitivity.

Specifically, the stability of the repetition rate frequency $nf_{rep}$ may be maintained at the stability level of the optical fiber delay line. Usually, since the stability $$\frac{\delta(\tau)}{\tau}$$

of the optical fiber delay line shows better performance than $10^{-14}$, the stability of the repetition rate frequency can also be maintained at a similar level.

Since the offset frequency has a value between 0 and $f_{rep}$, it can actually be said to have only an effect of $1/n$ compared to $nf_{rep}$. For example, when stabilizing $f_{ceo}$ to the level of $10^{-11}$, the effect of $f_{ceo}$ on $nf_{rep}$ is $10^{-11}/n$, and when n is an integer of about $10^6$, the effect is $10^{-17}$. Therefore, the stability $$\frac{\delta[nf_{rep}+f_{ceo}]}{nf_{rep}+f_{ceo}}$$

of the repetition rate frequency can be approximated to the stability $$\frac{\delta(\tau)}{\tau}$$

of the optical fiber delay line.

In this way, the frequency stabilizer 10b detects noise including the repetition rate frequency noise $\delta nf_{rep}$ and the offset frequency noise $\delta nf_{ceo}$, but the noise is a small value with the offset frequency stabilized. Therefore, the frequency stabilizer 10b substantially measures the repetition rate frequency noise $\delta nf_{rep}$. Thus, the frequency stabilizer 10b may stabilize the optical frequency comb by feeding the repetition rate frequency noise $\delta nf_{rep}$ back. However, when the repetition rate frequency is sufficiently stabilized with high resolution, the repetition rate frequency cannot be stabilized below the offset frequency noise level because the influence of the offset frequency cannot be ignored. That is, the frequency stabilization performance of the optical frequency comb is limited to the offset frequency noise level.

In the following, a technique wherein frequency stabilization performance of an optical frequency comb is not limited to an offset frequency by removing the influence of the offset frequency will be described.

Figure 5:
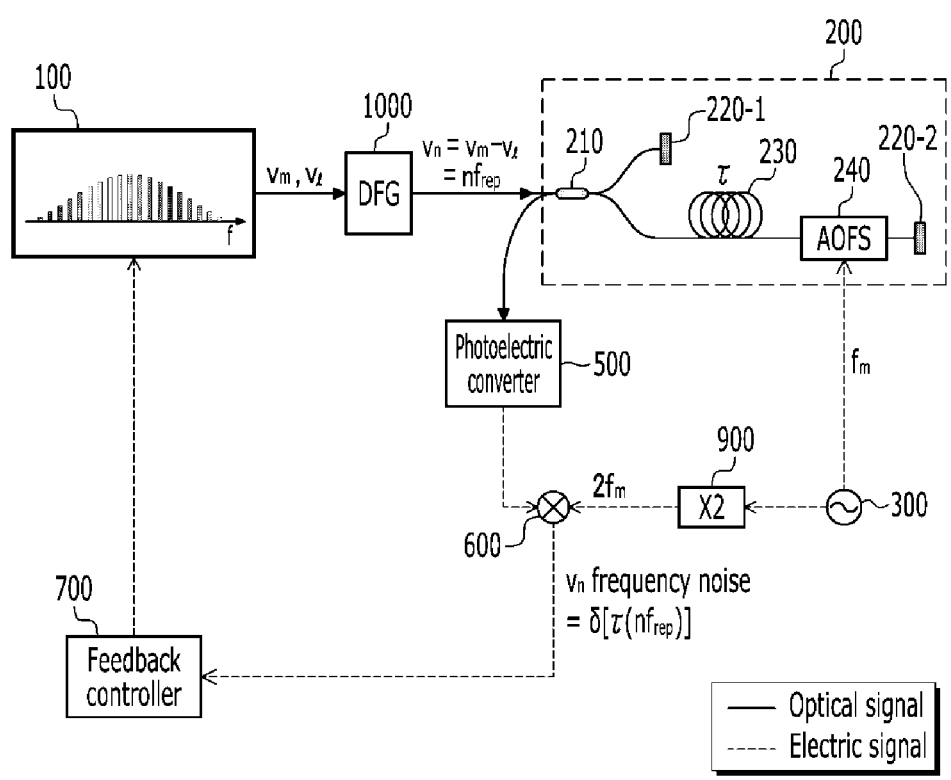
Figure 6:
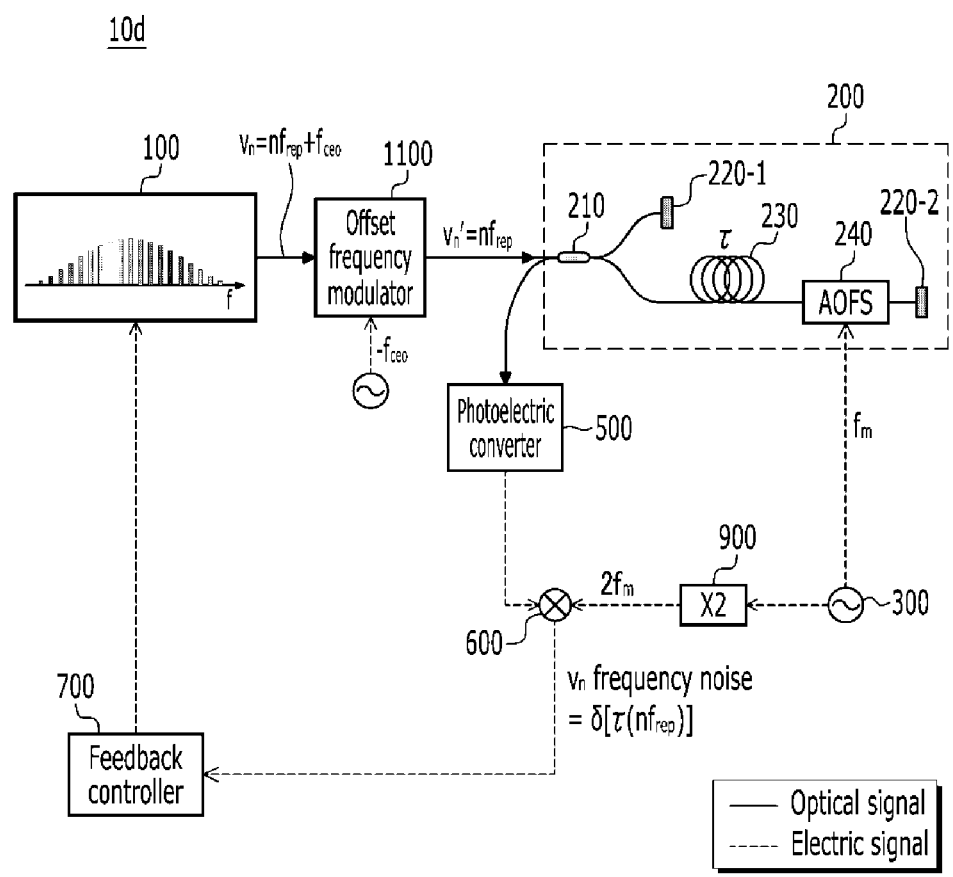
FIG. 6 is a block diagram of a frequency stabilizer using a single frequency mode according to another exemplary embodiment, respectively.

Each of FIG. 5 and FIG. 6 is a block diagram of a frequency stabilizer using a single frequency mode according to another exemplary embodiment, respectively.

Referring to FIG. 5, a frequency stabilizer 10c inputs an offset-free frequency signal to an optical fiber delay line interferometer 200 of the frequency stabilizer 10c. The frequency stabilizer 10c newly generates an offset-free frequency signal from a signal output from a pulsed laser 100, instead of using the pulsed laser 100 with the offset frequency stabilized. To this end, the frequency stabilizer 10c uses a difference frequency generator 1000 in which a difference frequency generation (DFG) technique is implemented, instead of the frequency stabilizer 10b.

The difference frequency generator 1000 is located between the pulsed laser 100 and the optical fiber delay line interferometer 200. The difference frequency generator 1000 spans the entire spectrum of the pulsed laser 100 with a high nonlinear optical fiber (HNLF) and interferes with two frequency signals that can generate a signal of frequency mode $v_n$ among the spanned spectrum. That is, in the difference frequency generator 1000, when the $m^{th}$ frequency mode $v_m$ ($=mf_{rep}+f_{ceo}$) signal and the $1^{th}$ frequency mode $v_1$ ($=1f_{rep}+f_{ceo}$) signal interfere with each other, a new signal $v_n[=(m-1)f_{rep}=nf_{rep}]$ having a difference frequency of two frequency modes is generated. The difference signal may be referred to as a difference frequency comb or a DGF comb. The difference signal is an optical signal corresponding to the $n^{th}$ frequency mode $v_n$ of the pulsed laser 100 and is an offset-free repetition rate frequency $nf_{rep}$.

The optical signal of the frequency mode $v_n$ ($v_n=nf_{rep}$) output from the difference frequency generator 1000 is transmitted to the optical fiber delay line interferometer 200, and the operation thereafter is the same as that of the frequency stabilizer 10b.

On the other hand, since a noise detected by the frequency stabilizer 10c essentially does not include an offset frequency noise, frequency stabilization performance is not limited to the offset frequency noise level, but can be maximized below the offset frequency noise level.

Referring to FIG. 6, a frequency stabilizer 10d inputs an offset-free frequency signal to an optical fiber delay line interferometer 200. To this end, the frequency stabilizer 10d removes an offset frequency from a signal output from a pulsed laser 100 and transmits the signal from which the offset frequency has been removed to the optical fiber delay line interferometer 200, instead of using the pulsed laser 100 with the offset frequency stabilized. To this end, the frequency stabilizer 10d may use an offset frequency modulator (shifter) 1100, unlike the frequency stabilizer 10b.

The offset frequency modulator 1100 is located between the pulsed laser 100 and the optical fiber delay line interferometer 200. The offset frequency modulator 1100 may be an acousto-optic frequency shifter (AOFS), shifting the frequency of an input signal by $-f_{ceo}$.

When an optical signal of an $n^{th}$ frequency mode $v_n$ ($v_n = nf_{rep} + f_{ceo}$) is output from the pulsed laser 100, the offset frequency modulator 1100 shifts the optical signal of the frequency mode $v_n$ by $-f_{ceo}$ and outputs an optical signal of $v_n'$ ($v_n' = nf_{rep}$) from which the offset frequency is removed.

The optical signal of the frequency mode $v_n'$ output from the offset frequency modulator 1100 is transmitted to the optical fiber delay line interferometer 200, and the operation thereafter is the same as that of the frequency stabilizer 10b.

As such, the frequency stabilizer 10d performs frequency stabilization using the frequency mode $v_n'$ from which the offset frequency is removed. Thus, like the frequency stabilizer 10c of FIG. 5, a noise detected in the frequency stabilizer 10d does not essentially include an offset frequency noise, thus frequency stabilization performance of an optical frequency comb is not limited to the offset frequency noise level but can be maximized below the offset frequency noise level.

Each of FIG. 7 to FIG. 9 is a graph showing a frequency stabilizing effect of a pulsed laser according to an exemplary embodiment, respectively Referring to FIG. 7, (a) is frequency noise performance of an unstabilized pulsed laser, and (b) is frequency noise performance of a pulsed laser in which stabilization is performed according to the exemplary embodiment described in FIG. 1. (c) shows a performance limit due to temperature, and (d) shows frequency noise performance of a pulsed laser in which stabilization is performed according to the exemplary embodiment described in FIG. 2.

Comparing (b) and (d), it can be seen that the stabilization performance difference between the two exemplary embodiments is quite large. In particular, considering that (d) does not have a large difference from (c), very good stabilization performance can be expected to a level close to a theoretically feasible limit.

Meanwhile, when stabilization is performed according to the exemplary embodiments described with reference to FIGS. 7 and 8, even an influence of an offset frequency may be removed to maximize frequency stabilization performance of an optical frequency comb below an offset frequency noise level.

FIGS. 8 and 9 exemplarily illustrate a repetition rate phase noise and Allan deviation result measured according to the frequency stabilization method of the pulsed laser according to the exemplary embodiment of FIG. 2. In FIGS. 8 and 9, INLOOP is a graph showing the best performance which can be obtained experimentally, and OUT-OF-LOOP is a graph showing practically implemented performance.

In this way, the frequency stabilizer of the present disclosure, which stabilizes an optical frequency comb of a pulsed laser using the optical fiber delay line interferometer 200, can obtain an experimental value of −94 dBc/Hz close to −100 dBc/Hz, which is a performance value that can be theoretically limited by an estimated temperature, and practically implemented stabilization performance of approximately −80 dBc/Hz. The frequency stability was found to be close to $10^{-15}$.

Since the frequency stabilizer of the present disclosure can approximate stability of a repetition rate frequency to stability of an optical fiber delay line, it is possible to guarantee a very small, low cost and excellent noise performance compared to the prior art.

FIG. 10 is a block diagram of a frequency stabilizer for a plurality of pulsed lasers according to an exemplary embodiment.

Referring to FIG. 10, a frequency stabilizer 10e may include a plurality of pulsed lasers 100-1, . . . , 100-n, an optical fiber delay line interferometer 200e, an oscillator 300, wavelength division multiplexers 400a and 400b, a plurality of photoelectric converters 500-1, . . . , 500-n corresponding to the plurality of pulsed lasers, and a plurality of mixers 600-1, . . . , 600-n corresponding to the plurality of pulsed lasers, feedback controllers 700-1, . . . , 700-n corresponding to the plurality of pulsed lasers, and a frequency multiplier 900. The frequency stabilizer 10e may simultaneously stabilize the plurality of pulsed lasers, regardless of repetition rates of the plurality of pulsed lasers 100-1, . . . , 100-n.

Optical signals of different frequencies $v_1, \ldots, v_n$ are extracted at each of the plurality of pulsed lasers 100-1, . . . , 100-n. It is assumed that each of the plurality of pulsed lasers 100-1, . . . , 100-n is at the state that the offset frequency is stabilized by the offset frequency stabilizer 800 described with reference to FIG. 2. Alternatively, as shown in FIG. 5 or FIG. 6, a signal from which the offset frequency is removed may be used for frequency stabilization of the corresponding pulsed laser. If the repetition rate of the $i^{th}$ pulsed laser is $f_{ref}$, and the offset frequency is $f_{ceo}$, the frequency signal $v_i$ extracted from the $i^{th}$ pulsed laser may be expressed as $[n_i f_{ref,i} + f_{ceo,i}]$. Here, $n_i$ is a frequency mode number.

The wavelength division multiplexer 400a multiplexes different frequency signals $v_1, \ldots, v_n$ extracted from the plurality of pulsed lasers 100-1, . . . , 100-n, and transmits the multiplexed signals into the optical fiber delay line interferometer 200e.

The optical fiber delay line interferometer 200e includes a reference arm and a delay arm by an optical fiber delay line τ and interferes with two signals passing through different arms. In this case, the signal transmitted to the delay arm is delayed by the optical fiber delay line τ and frequency modulated by a frequency modulator (AOFS) 240, compared to the optical signal transmitted through the reference arm. In this case, the frequency modulator (AOFS) 240 shifts the optical signal frequency passing through the delay arm by the frequency $f_m$ of the oscillator 300.

Meanwhile, the optical fiber delay line interferometer 200e may further include tunable delay lines that can adjust the delay time of each frequency signal in the delay arm so that interference occurs effectively. Specifically, a wavelength de-multiplexer, a plurality of tunable delay lines, and a wavelength multiplexer may be further included to adjust the delay time of each frequency signal.

The optical fiber delay line interferometer 200e outputs an interference signal, and the wavelength division multiplexer 400b divides (de-multiplexes) the interference signal into respective frequency signals.

Each frequency signal divided from the wavelength division multiplexer 400b is input to a corresponding photoelectric converter among the plurality of photoelectric converters 500-1, ..., 500-n, and is converted into a microwave signal of a corresponding frequency. The microwave signals output from the photoelectric converters 500-1, ..., 500-n may be expressed as $\delta[\tau(v_1+2f_m)]$, $\delta[\tau(v_2+2f_m)]$, ..., $\delta[\tau(v_n+2f_m)]$.

The microwave signals output from the photoelectric converters 500-1, ..., 500-n are input to the corresponding mixers 600-1, ..., 600-n. Each of the mixers 600-1, ..., 600-n receives a signal having frequency $2f_m$ from the multiplier 900 and outputs a signal in which common components of the two input signals are canceled.

The noise $\delta[\tau v_i]$ of each frequency signal output from each mixer is fed back to the corresponding pulsed laser through the feedback controllers 700-1, ..., 700-n. When the offset frequency $f_{ceo}$ included in each frequency signal is stabilized, the noise of the offset frequency is smaller than the noise of the repetition rate frequency. Therefore, the frequency stability $$\frac{\delta(v_1)}{v_1}$$

of each of the plurality of pulsed lasers 100-1, ..., 100-n is maintained at the same level as the stability $$\frac{\delta(\tau)}{\tau}$$

of the optical fiber delay line.

Meanwhile, since the plurality of frequency signals ($v_1$, ..., $v_n$) being input to the optical fiber delay line interferometer 200e have different frequencies, their propagation speeds will be changed as they pass through the optical fiber delay line ($\tau$). Therefore, the speed difference can be compensated for in the optical fiber delay line interferometer 200e so that the interference occurs simultaneously in the optical fiber delay line interferometer 200e. Alternatively, when the optical fiber delay line interferometer 200e is fixed to the optical fiber delay line $\tau$ of a specific length, the optical fiber delay line interferometer 200e may simultaneously stabilize the pulsed lasers having a repetition rate difference, $\Delta f_{ref} = f_{rep,1} - f_{rep,2}$, where the interference may occur.

As a simple example, let's consider a case where a first signal ($v_n$=194.67 THz, 1540 nm) and a second signal ($v_m$=192.17 THz, 1560 nm) of different frequencies are filtered in each of the two pulsed lasers 100-1 and 100-2 and transmitted to the optical fiber delay line interferometer 200e, both signals pass through a 1 km-long optical fiber delay line ($\tau$), and, for computational convenience, the repetition rates ($f_{rep}$) of the two pulsed lasers are equally 250 MHz. In this case, the repetition rate may be adjusted in order for the repetition rate difference $\Delta f_{ref}$ of the two pulsed lasers to be 25 kHz so that the interference of the two frequency signals occurs at the same time in the optical fiber delay line interferometer 200e. In other words, it can be seen that two pulsed lasers having the repetition rate difference of 25 kHz can be stabilized with the 1 km-long optical fiber delay line $\tau$.

In dual-comb spectroscopy and distance measurement, two pulsed lasers having a repetition rate difference of several kHz to several tens of kHz are used, and they can be simultaneously frequency stabilized through the frequency stabilizer 10e.

In the following, a method of compensating for the speed difference in the optical fiber delay line interferometer 200e so that the interference occurs simultaneously in the optical fiber delay line interferometer 200e regardless of the repetition rate of each pulsed laser will be described.

Each of FIG. 11 to FIG. 13 is a block diagram illustrating an optical fiber delay line interferometer used in a frequency stabilizer of a multi-pulsed laser according to an exemplary embodiment, respectively.

Referring to FIG. 11, similar to the optical fiber delay line interferometer 200, an optical fiber delay line interferometer 200e-1 includes a reference arm and a delay arm by an optical fiber delay line $\tau$ and interferes with two signals passing through the reference arm and the delay arm. Similar to the optical fiber delay line interferometer 200, the optical fiber delay line interferometer 200e-1 includes a coupler 210, Faraday rotor mirrors 220-1, 220-2, an optical fiber delay line 230, and a frequency modulator 240, and the frequency modulator 240 may be an acousto-optic frequency shifter (AOFS).

In this case, the optical fiber delay line interferometer 200e-1 includes a delay control unit (DUC) 250 between the optical fiber delay line 230 and the frequency modulator 240. The delay control unit (DCU) 250 compensates for speed differences of frequency signals extracted from each pulsed laser so that interference occurs at the coupler 210 simultaneously, regardless of a repetition rate of each pulsed laser.

The delay control unit (DCU) 250 receives a signal passing through the optical fiber delay line 230, and the input signal includes frequency signals extracted from each pulsed laser. The delay control unit (DCU) 250 separates an input signal into a corresponding frequency signal through the WDM, advances each separated frequency signal into a separate path, and then multiplexes the frequency signals passing through the individual path with the WDM. The multiplexed signals are transmitted to the frequency modulator 240. In this case, each of the separated frequency signals passes a designated path, each path may be a tunable delay line that can be adjusted in length. That is, the delay control unit (DCU) 250 varies the length of the path according to the frequency to compensate for the speed difference due to the frequency difference.

Referring to FIG. 12 (a), similar to the optical fiber delay line interferometer 200, an optical fiber delay line interferometer 200e-2 includes a reference arm and a delay arm by an optical fiber delay line $\tau$ and interferes with two signals passing through the reference arm and the delay arm. Similar to the optical fiber delay line interferometer (200), the optical fiber delay line interferometer (200e-2) includes a coupler 210, Faraday rotor mirrors 220-1, 220-2, an optical fiber delay line 230, and a frequency modulator 240, and the frequency modulator 240 may be an acousto-optic frequency shifter (AOFS).

In this case, the optical fiber delay line interferometer 200e-2 includes a dispersion compensating fiber (DCF) 260 between the optical fiber delay line 230 and the frequency modulator 240.

The DCF 260 compensates for speed differences occurring in a delay arm composed of ordinary optical fiber. Since the speed differences which can be compensated for vary depending on the length of the DCF, the DCF 260 may compensate for speed differences of frequency signals extracted from each pulsed laser so that interference occurs at the coupler 210 simultaneously, regardless of the repetition rate of each pulsed laser.

Referring to FIG. 12 (b), since the DCF has the opposite of frequency-specific speed characteristics in a single-mode fiber (SMF) (or ordinary optical fiber), when an optical fiber delay line, which is an ordinary optical fiber, and the DCF are used together, the speed difference due to the frequency difference can be reduced.

As mentioned earlier, it is assumed that a first signal ($v_n$=194.67 THz, 1540 nm) and a second signal ($v_m$=192.17 THz, 1560 nm) of different frequencies are filtered in each of the two pulsed lasers 100-1 and 100-2 and transmitted to the optical fiber delay line interferometer 200e-2 of a 1 km-long fiber delay line (τ), and the repetition rates ($f_{rep}$) of the two pulsed lasers is 250 MHz. In this case, in order for the interference of the two frequency signals to occur at the same time in the optical fiber delay line interferometer 200e, the repetition rate has to be adjusted such that the repetition rate difference $\Delta f_{ref}$ of the two pulsed lasers is 25 kHz. In this case, without the repetition rate adjustment or variable delay line, when 99.6732 m of a dispersion compensating fiber is used in the optical fiber delay line interferometer (200e-2), the interference of two frequency signals occurs simultaneously. That is, the repetition rate must be adjusted so that a repetition rate difference of 25 kHz is obtained in order to compensate for the 20 nm of difference between the first signal and the second signal, however, if 99.6732 m of the dispersion compensating fiber is used instead of changing the repetition rate, the speed difference between the first signal and the second signal is almost compensated for and interference may occur simultaneously.

With the speed difference being compensated for by the dispersion compensating fiber, it is assumed that 1561 nm is extracted instead of 1560 nm by changing a filter of the pulsed laser 100-2 among the two pulsed lasers 100-1 and 100-2. Then, since a center wavelength of the signal passing through the optical fiber delay line interferometer 200e-2 is changed, the interference condition in the optical fiber delay line interferometer 200e-2 is changed. In this case, if the difference between the repetition rates of the two pulsed lasers is adjusted such that it is about 1 Hz, the interference occurs simultaneously.

In this way, the extracted frequency and the repetition rate difference of the pulsed laser can be finely adjusted in a state where the speed is compensated for to some extent with the dispersion compensating fiber. Referring to Table 1, while $f_{rep,1}$ is fixed at 250 MHz, the length of the distributed compensation fiber (DCF) for speed compensation is calculated differently according to $f_{rep,2}$. In this state where the length of the dispersion compensation fiber (DCF) is fixed, if a 1560 nm wavelength extracted from the pulsed laser 100-2 is changed to a 1561 nm wavelength, the repetition rate difference $\Delta f_{rep}$ can be adjusted very finely for each of the interference conditions.

TABLE 1

| | | | |
|---|---|---|---|
| $f_{rep,1}$ (MHZ) | 250 | 250 | 250 |
| $f_{rep,2}$ (MHZ) | 250 | 250.001 | 250.01 |
| DCF length(m) | 99.6732 | 105.8657 | 164.915 |
| $\Delta f_{rep}$ (kHz) to be adjusted when changing 1560 nm to 1561 nm | 0.001 | −0.255 | −2.564 |

Referring to FIG. 13 (a), similar to the optical fiber delay line interferometer 200, an optical fiber delay line interferometer 200e-3 includes a reference arm and a delay arm by an optical fiber delay line τ and interferes with two signals passing through the reference arm and the delay arm. Similar to the optical fiber delay line interferometer (200), the optical fiber delay line interferometer (200e-3) includes a coupler 210, mirrors 220-3, 220-4, an optical fiber delay line 230, and a frequency modulator 240, and the frequency modulator 240 may be an acousto-optic frequency shifter (AOFS).

In this case, the optical fiber delay line interferometer 200e-3 includes a polarization maintaining fiber (PMF) 270 between the optical fiber delay line 230 and the frequency modulator 240. The optical fiber delay line interferometer 200e-3 may further include a polarization controller (PC) (not shown) at both ends of the polarization maintaining fiber 270 to transmit different frequency signals on different axes of the polarization maintaining fiber 270. In this case, since the polarization maintaining fiber is used, the general mirrors 220-3 and 220-4 may be used instead of Faraday rotating mirrors.

Referring to FIG. 13 (b), the polarization maintaining fiber (PMF) transmits optical pulses on two axes, but the transmission speeds of the two axes differ. Specifically, the speed of light differs by about 0.04% between the slow axis and the fast axis. By using the characteristics of the polarization maintaining fiber having the slow axis and the fast axis, it is possible to compensate for speed differences of frequency signals extracted by each pulsed laser.

As mentioned earlier, it is assumed that a first signal ($v_n$=194.67 THz, 1540 nm) and a second signal ($v_m$=192.17 THz, 1560 nm) of different frequencies are filtered in each of the two pulsed lasers 100-1 and 100-2 and transmitted to the optical fiber delay line interferometer 200e-2 of a 1 km-long fiber delay line (τ), and the repetition rates ($f_{rep}$) of the two pulsed lasers is 250 MHz. In this case, in order for interference of the two frequency signals to occur at the same time in the optical fiber delay line interferometer 200e, the repetition rate has to be adjusted such that the repetition rate difference $\Delta f_{ref}$ of the two pulsed lasers is 25 kHz. In this case, without the repetition rate adjustment or variable delay line, when 354.02 m of a polarization maintaining fiber is used in the optical fiber delay line interferometer (200e-3), the interference of two frequency signals occurs simultaneously. That is, the repetition rate must be adjusted so that a repetition rate difference of 25 kHz is obtained in order to compensate for the 20 nm of difference between the first signal and the second signal, however, if 354.02 m of the polarization maintaining fiber is used instead of changing the repetition rate, the speed difference between the first signal and the second signal is almost compensated for and interference may occur simultaneously.

Referring to Table 2, while $f_{rep,1}$ is fixed at 250 MHz, the length of the polarization maintaining fiber (PMF) for speed compensation is calculated according to $f_{rep,2}$. In this state where the length of the polarization maintaining fiber (PMF) is fixed, if the frequency 192.17 THz extracted from the pulsed laser 100-2 is changed to 192.79 THz, the repetition rate difference $\Delta f_{rep}$ can be adjusted very finely for each of the interference conditions.

TABLE 2

| | | | |
|---|---|---|---|
| $f_{rep,1}$ (MHZ) | 250 | 250 | 250 |
| $f_{rep,2}$ (MHZ) | 250 | 250.001 | 250.01 |
| PMF length(m) | 354.02 | 381.49 | 690.05 |
| $\Delta f_{rep}$ (kHz) to be adjusted when changing 192.17 THz to 192.79 THz | −8.599 | −9.338 | −15.984 |

Thus, according to the exemplary embodiments, it is possible to provide a frequency stabilizer which is extremely small, low cost and excellent in noise performance. In addition, by generating an optical signal/microwave signal through a stabilized pulsed laser, it is possible to provide a low noise optical signal/microwave signal source. According to the exemplary embodiments, a single optical fiber delay line can stabilize a plurality of lasers at once. The frequency stabilizers according to the exemplary embodiments have excellent noise performance, competitive price, and mechanical stability compared to the conventional optical frequency stabilizers or microwave frequency synthesizers.

The exemplary embodiments described above may be implemented as hardware components, software components, and/or combinations of hardware components and software components. For example, the devices, methods, and components described in the exemplary embodiments may be implemented using one or more general-purpose or special purpose computers, such as a processor, a controller, an arithmetic logic unit (ALU), a digital signal processor, a microcomputer, a field-programmable gate array (FPGA), a programmable logic unit (PLU), a microprocessor, or any other devices capable of executing and responding to instructions. The processing device may execute an operating system (OS) and one or more software applications running on the operating system. The processing device may also access, store, manipulate, process and generate data in response to the execution of the software. For the convenience of explanation, it may be described that one processing apparatus is used. But a person having ordinary skill in the art may recognize that the processing device may include a plurality of processing elements and/or a plurality of types of processing elements. For example, the processing device may include a plurality of processors or one processor and one controller. In addition, other processing configurations are possible, such as parallel processors.

The software may include a computer program, code, instructions, or a combination of one or more of these. Furthermore, the software can configure the processing device to operate as desired or can command the processing device independently or collectively. The software and/or the data may be permanently or temporarily embodied in any type of machine, component, physical device, virtual equipment, computer storage medium or device in order to be interpreted by or provide instructions or data to a processing device. The software may also be distributed over networked computer systems to be stored or executed in a distributed manner. The software and the data may be stored on one or more computer-readable storage media.

The method according to an exemplary embodiment may be embodied in the form of program instructions that can be executed by various computer means and recorded on a computer-readable medium. The computer-readable medium may include program instructions, a data file, a data structure, etc. alone or in combination. The program instructions recorded on the medium may be those specially designed and constructed for the purposes of the exemplary embodiments, or they may be of the kind well-known and available to a person having skill in the computer software arts. Examples of computer-readable storage media include magnetic media such as hard disks, floppy disks, and magnetic tapes, optical media such as CD-ROMs and DVDs, magneto-optical media such as floptical disks, and hardware devices specifically configured to store and execute program instructions, such as ROMs, RAMs, flash memories, and the like. Examples of program instructions include not only machine code generated by a compiler, but also high-level language code that can be executed by a computer using an interpreter or the like. The hardware devices described above may be configured to operate as one or more software modules to perform the operations of the exemplary embodiments, and vice versa.

The aforementioned exemplary embodiment of the present disclosure is not implemented only by the apparatus and the method, and may be implemented by a program executing a function corresponding to the configuration of the exemplary embodiment of the present disclosure or a recording medium, in which the program is recorded.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A frequency stabilizer comprising:
   a delay line interferometer that receives an optical signal corresponding to one frequency mode of a pulsed laser, divides and transmits the received optical signal to a reference arm and a delay arm including an optical fiber delay line, and then outputs an interference signal between signals passing through the reference arm and the delay arm;
   a photoelectric converter that converts the interference signal into an electrical signal;
   a mixer that generates a baseband signal of the electrical signal by mixing a carrier frequency signal; and
   a feedback controller that transmits a control signal generated based on the baseband signal to the pulsed laser,
   wherein the optical signal passing through the delay arm is weighted with a delay time caused by the optical fiber delay line compared to the optical signal passing through the reference arm, and the optical signal passing through the delay arm is frequency shifted to a carrier frequency of an oscillator, and
   wherein a carrier-envelope offset frequency of the pulsed laser is stabilized by an offset frequency stabilizer.

2. The frequency stabilizer of claim 1, wherein the delay line interferometer includes:
   a coupler that divides and transmits the received optical signal to the reference arm and the delay arm, and then outputs the interference signal between signals passing through the reference arm and the delay arm to the photoelectric converter;
   the optical fiber delay line located in the delay arm; and
   a frequency modulator that shifts the frequency of the optical signal passing through the delay arm to the carrier frequency of the oscillator.

3. The frequency stabilizer of claim 1, wherein:
the offset frequency stabilizer detects the value of the carrier-envelope offset frequency using two frequency modes extracted from the pulsed laser, and fixes the carrier-envelope offset frequency of the pulsed laser to the detected value, or to zero.

4. The frequency stabilizer of claim 1, further comprising:
a multiplier that multiplies the carrier frequency of the oscillator,
wherein the mixer mixes the carrier frequency signal multiplied by the multiplier and the electrical signal, and generates the baseband signal of the electrical signal.

* * * * *